United States Patent [19]
Witt

[11] 3,767,011
[45] Oct. 23, 1973

[54] PORTABLE SEAT
[76] Inventor: Karl J. Witt, 2080 Canada Road, Casnovia Township, Mich. 49318
[22] Filed: June 12, 1972
[21] Appl. No.: 261,922

[52] U.S. Cl. ............................................... 182/187
[51] Int. Cl. ............................................. A47c 9/10
[58] Field of Search ................................... 182/187

[56] References Cited
UNITED STATES PATENTS

| | | | |
|---|---|---|---|
| 2,060,953 | 11/1936 | Stom | 182/187 |
| 3,006,433 | 10/1961 | Farver | 182/187 |
| 3,353,629 | 11/1967 | Brunes | 182/187 |
| 2,168,111 | 8/1939 | Barnes | 182/187 |

Primary Examiner—Reinaldo P. Machado
Attorney—Peter P. Price et al.

[57] ABSTRACT

A portable seat includes mounting means having a pair of vertically spaced horizontally extending annular surfaces adapted to be positioned in contact with a tree trunk or the like and span a circumferential portion of the trunk. Fastening means extends around the trunk and attaches to the mounting bracket near the upper of the annular surfaces. The surfaces are displaced along a vertical axis to hold the seat in a slightly upwardly projecting position with no force thereon such that it will be generally horizontally positioned when in use.

11 Claims, 5 Drawing Figures

PATENTED OCT 23 1973 3,767,011

PORTABLE SEAT

BACKGROUND OF THE INVENTION

The present invention relates to a portable seat adapted to be attached to a tree.

Hunters and other sportsmen who spend considerable time in remote areas frequently desire to rest in a sitting position or must sit motionless while awaiting game such as deer to pass within their field of vision. Frequently, there is no available natural location for sitting and in the winter months where natural resting locations are covered with snow or are otherwise relatively cold, a portable seat is a convenient item for the sportsman to carry.

U.S. Pat. Nos. 305,100 issued on Sept. 16, 1884 to C. Moore and 3,340,828 issued on Sept. 12, 1967 to R. J. Smith, et al., describe portable seats which can be attached to trees or the like and are representative of known devices. Such known seats are relatively complex and therefore expensive and frequently bulky, making them somewhat difficult to carry. Also, many such seats do not provide a secure coupling of the seat to a tree in a stable manner necessary to accommodate heavy individuals. In the case of deer hunters for example, the seat must be capable of use without motion due to wobbling or the like so the hunter can remain motionless.

The known portable seats, although providing means for attaching the seat to a tree, do not employ a relatively simple and efficient mounting bracket which secures the seat both in horizontal and vertical directions or insure that the seat will be horizontal during use.

SUMMARY OF THE INVENTION

The seat of the present invention, however, comprises an integral seat and mounting bracket which is relatively inexpensive to manufacture and which provides a secure mounting for the seat to a tree. Additionally, the mounting bracket is designed to maintain the seat in a stable horizontal position during use and provides carrying means to facilitate transporting the seat when not being used.

Apparatus embodying the present invention comprises a seating platform having an integral mounting bracket including a pair of horizontally extending annular surfaces vertically spaced from one another and adapted to be positioned in engagement with a vertical member having a generally curved surface. Fastening means anchored at one side of the mounting bracket is adapted to extend around the vertical member and is adjustably and removably secured to an opposite side of the mounting bracket. The annular surface is displaced along a vertical axis to insure the seat lies in a generally horizontal plane when in use.

It is an object therefore of the present invention to provide an improved portable seat for attaching to a tree or the like.

It is an additional object of the present invention to provide a portable seat with a unique mounting bracket integrally formed therewith.

It is still a further object of the present invention to provide a portable seat which employs fastening means for attaching the seat to a tree or the like and also serves as carrying means.

Another object of the present invention is to provide a lightweight and inexpensive portable seat.

These and other objects of the present invention will become apparent upon reading the following specification together with the accompanying drawings.

DETAILED DESCRIPTION OF THE PREFERRED EMBODIMENT

Figure 1:
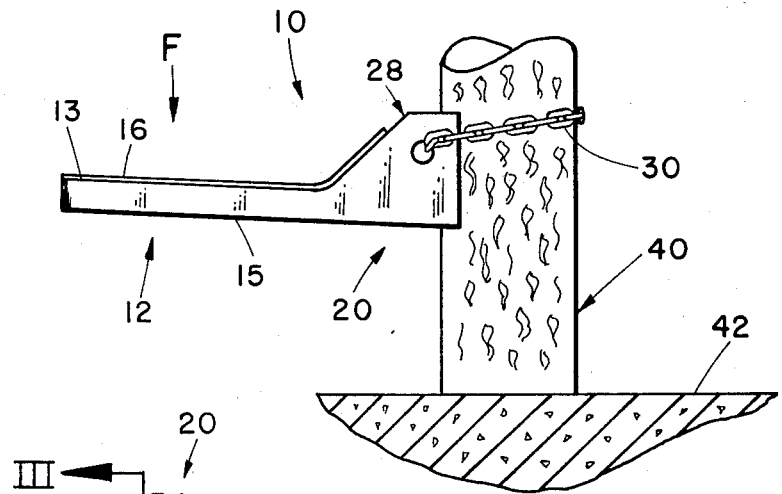
FIG. 1 is a side elevational view partially cut away showing the portable seat of the present invention attached to a tree.

Referring now to the figures, it is seen that the seat 10 includes a flared seat portion 12 having upper and lower surfaces 13 and 14 respectively. A mounting bracket portion 20 is integrally molded with the seat 12 such as by casting an aluminum or aluminum alloy to provide a relatively lightweight but strong structure. Likewise, the seat can be molded of a fiberglas reinforced polymer such as polystyrene polyurethane or polypropylene, or of steel.

A pad 16 is attached to the upper surface 13 of the seat by means of a suitable adhesive. The pad can be any suitable insulating and/or relatively elastic material to provide a more comfortable seating surface for the user. The seat includes a downwardly depending peripherally extending lip 15 for added strength.

The mounting bracket 20 is a generally rectangular member and includes a right side wall 22 having means such as a bolt 24 for anchoring one end of fastening means such as a chain 30 near the top of the bracket. The opposite end of the chain 30 extends into an aperture 28 formed in the left side wall 26 of the mounting bracket. Aperture 28 includes a circular portion 29 and a radially extending elongated slot 31 communicating with the circular portion for attaching the seat to a tree as described below.

Figure 2:
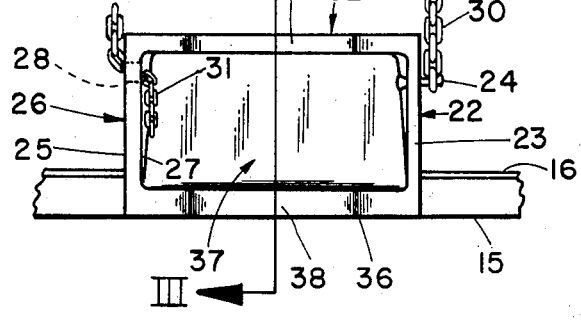
FIG. 2 is a fragmentary end elevational view of the seat of the present invention showing the mounting bracket.
Figure 4:
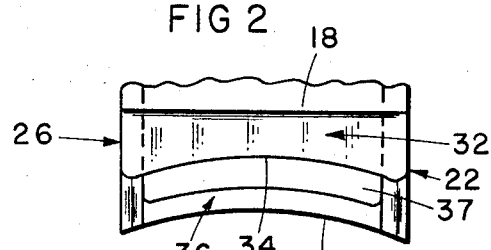
FIG. 4 is a fragmentary plan view of the seat showing the mounting bracket.
Figure 3:
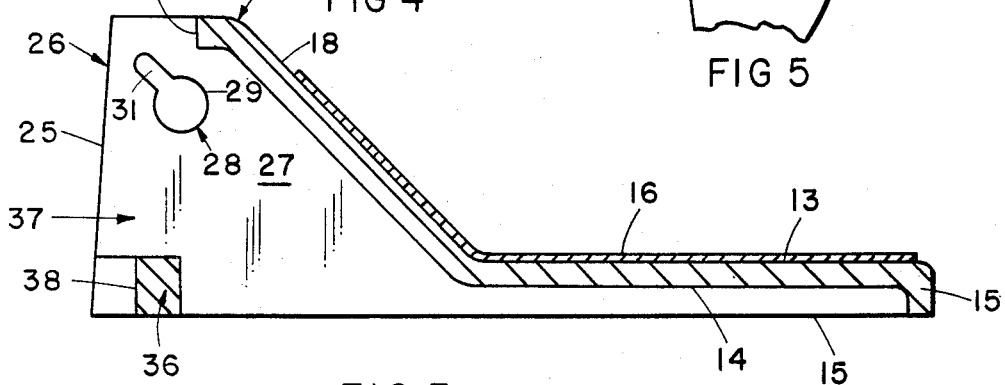
FIG. 3 is a cross-sectional view of the mounting bracket and seat taken along the section lines III—III of FIG. 2.

As seen in FIGS. 2, 3 and 4, the mounting bracket also includes a top wall 32 which extends between walls 22 and 26 and includes an annular shaped horizontally extending vertically oriented end surface 34 which is adapted to be seated against a curved object such as a tree trunk to circumscribe a peripheral portion thereof. An upwardly extending portion 18 of the seat 12 couples the seat to the wall 32 and to side walls 22 and 26. At the lower end of the downwardly depending side walls 22 and 26, an annular brace or support member 36 extends between the side walls and includes a horizontally extending vertically oriented annular surface 38 thereon which is adapted to be seated against a curved surface and circumscribe a portion thereof. The radius of curvature of both surfaces 34 and 38 is selected for mating to average sized trees.

It is seen in FIGS. 3 and 4 that surface 38 of brace 36 is horizontally displaced relative to surface 34 of the wall 32 (i.e., positioned forwardly). As seen in FIG. 3, the plane of the seat member 12 is generally aligned with the lower support member or brace 36. The rear edges 23 and 25 of the side walls 22 and 26 respectively are slightly inwardly tapered from top to bottom as shown in FIG. 3. The side wall, top surface and brace structure therefore, define an open central area 37 (FIGS. 2 through 4) which reduces the weight of the seat as well as provides access to permit fastening the chain 30 to the side wall 26.

In use, the surfaces 23, 25, 34 and 38 are seated firmly against a tree 40 (FIG. 1) at the desired vertical space from the ground 42. Chain 30 is then extended around the trunk of the tree and its free end 31 inserted into aperture 28 (FIGS. 1 and 3). The chain, which is sufficiently long to accommodate most trees, is then tightened by reaching into the open area 37 and pulling the chain through aperture 28 until taut. The chain is then secured to aperture 28 by fitting a link into slot 31 while the next adjacent link holds the chain in position by contacting the inner surface 27 of wall 26 as shown in FIG. 2.

By providing the generally rectangular mounting bracket with the access opening 37, it is possible to install the seat relatively snugly against the tree. Before weight is applied, the seat is tilted upwardly slightly as seen in FIG. 1. When used, the force (arrow F in FIG. 1) due to the body weight tends to rotate the seat downwardly slightly about brace 36 thereby providing suspension of the seat in a generally horizontal plane when in use.

The ends of the side walls 22 and 26 will contact the tree at spaced intervals along the periphery thereof and together with the annular surfaces, provide lateral support for the seat while the chain and brace provide vertical support to hold the seat in a cantilevered fashion to the tree.

Figure 5:
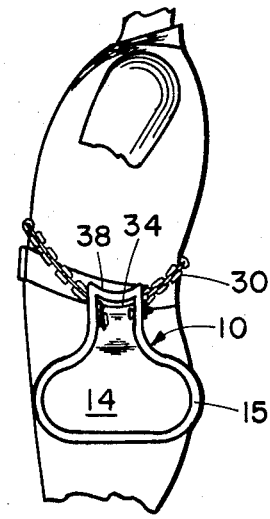
FIG. 5 is a partial side elevation view illustrating the attachment of the seat to the waist of the user for carrying the seat.

As seen in FIG. 5, the fastening means for attaching the seat to the tree can likewise be employed for carrying the seat when not in use. Thus, the seat can be strapped around the waist of the user by using chain 30 as seen in FIG. 5. The chain can likewise be extended over one shoulder of the user for carrying the seat. The most comforatable carrying position for the seat is with the pad 16 inwardly against the body of the user.

It will become apparent to those skilled in the art that various fastening means can be employed with the novel mounting bracket and seat of the present invention. Likewise, the bracket and seat need not be integrally molded. These and other modifications to the preferred embodiment shown and described can be made without departing from the spirit or scope of the present invention as defined by the appended claims.

What is claimed is:

1. A portable seat adapted to be secured to the trunk of a tree or other like vertically extending member comprising:

an integral seat platform and moutning bracket;

said mounting bracket including a generally vertically oriented, generally annular tree abutting means having sufficient height to provide tree abutting surfaces spaced vertically a sufficient distance to give stability to said seat;

said annular tree abutting means extending between and being supported by a pair of horizontally spaced suport walls;

said support walls extending forwardly from said tree abutting means and merging into and supporting said seat platform;

said seat platform extending forwardly from generally the lower portion of said mounting bracket in line generally with the lower portion of said tree abutting means; and fastening means adapted to extend around a tree or the like and having one end anchored to said mounting bracket at a point above the level of said seat platform and an opposite end detachably and adjustably secured to said mounting bracket at a point above the level of said seat platform.

2. The apparatus as defined in claim 1 wherein said tree abutting means comprises a pair of vertically spaced, separated anular support surfaces; one of said annular support surfaces comprising an end of a wall extending between said support walls at one end thereof, and the other of said surfaces comprising the end of a support brace extending between said support walls at an opposite end thereof.

3. The apparatus as defined in claim 2 wherein said pair of annular support surfaces comprise upper and lower surfaces and said lower surface projects away from said seat portion a greater distance than said upper surface and lies substantially in the same plane as said seat.

4. The apparatus as defined in claim 1 wherein said fastening means comprises a chain having one end anchored to one of said support walls near the top thereof and an opposite end releasably fastened to a slotted aperture in the other of said support walls.

5. The portable seat of claim 1 in which said seat platform slopes generally diagonally upwardly at the rear thereof, said diagonally upwardly sloping portion extending between and being supported by said support walls, and said diagonally upwardly sloping portion extending upwardly to generally the top of said mounting bracket.

6. The portable seat of claim 5 in which said seat platform extends from said mounting bracket at slightly less than a right angle thereto whereby when weight is placed on said platform, the lower surface areas of said tree abutting means tend to seat more securely against a tree.

7. The portable seat of claim 5 in which said support walls are generally triangular in configuration, terminating at their top edge at said upwardly sloping portion of said seat platform.

8. The portable seat of claim 1 in which said seat platform includes a generally horizontally oriented portion which extends laterally beyond each of said support walls and is generally saddle shaped in configuration.

9. A portable seat adapted to be secured to the trunk of a tree or other like vertically extending member, said portable seat comprising: a mounting bracket including a generaly vertically oriented, generally annular tree abutting means having sufficient height to provide tree abutting surfaces spaced vertically a sufficient distance to give stability to said seat; said annular tree abutting means extending between and being supported by a pair of horizontally spaced support walls, said support walls extending forwardly from said tree abutting means; a seat platform joined to said support walls and being supported thereby, said seat platform extending generally horizontally forwardly from said mounting bracket from generally the lower portion of said mounting bracket; said seat platform sloping generally diagonally upwardly at the rear thereof, said diagonally upwardly sloping portion extending between and being supported by said support walls, and said diagonally upwardly sloping portion extending upwardly to generally the top of said mounting bracket; fastening means adapted to extend around a tree or the like and having one end anchored to said mounting bracket at a point above the level of said generally horizontal portion of said seat platform and an opposite end detachably and adjustably secured to said mounting bracket at a point above the level of said generally horizontal portion of said seat platform.

10. The apparatus as defined in claim 9 wherein said fastening means comprises a chain having one end anchored to one of said support walls near the top thereof and an opposite end releasably fastened to a slotted aperture in the other of said support walls.

11. The portable seat of claim 9 in which said support walls are generally triangular in configuration, terminating at their top edge at said upwardly sloping portion of said seat platform.

* * * * *